July 25, 1939.　　　U. C. MURCELL　　　2,167,338
WELDING AND SETTING WELL CASING
Filed July 26, 1937　　　2 Sheets-Sheet 1

Uriel C. Murcell
INVENTOR.

BY *Elwin C. Andrus*
ATTORNEY.

July 25, 1939.  U. C. MURCELL  2,167,338
WELDING AND SETTING WELL CASING
Filed July 26, 1937 2 Sheets-Sheet 2
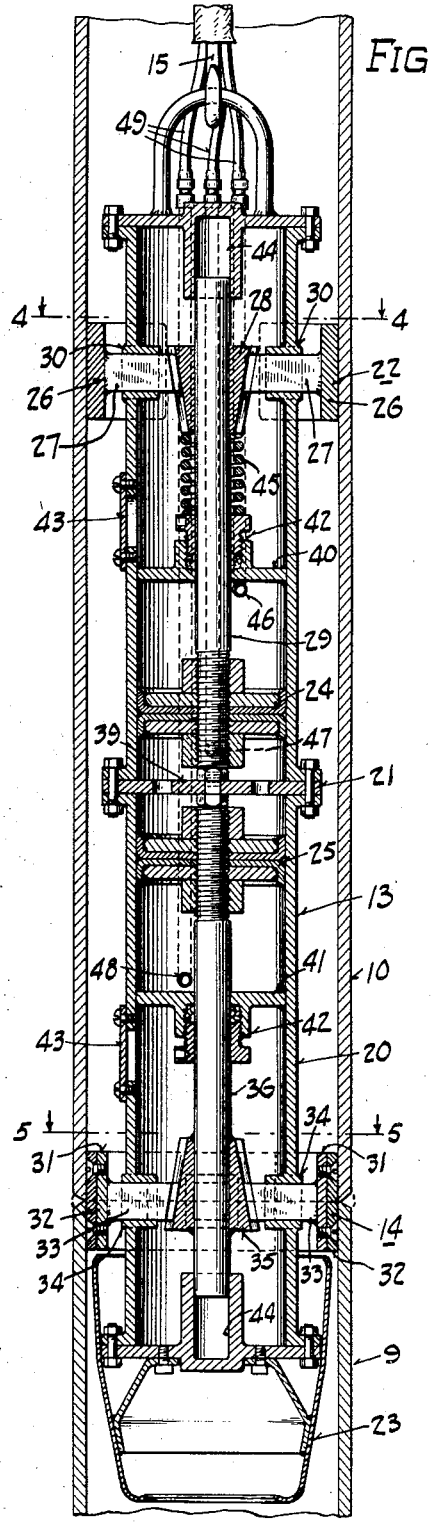
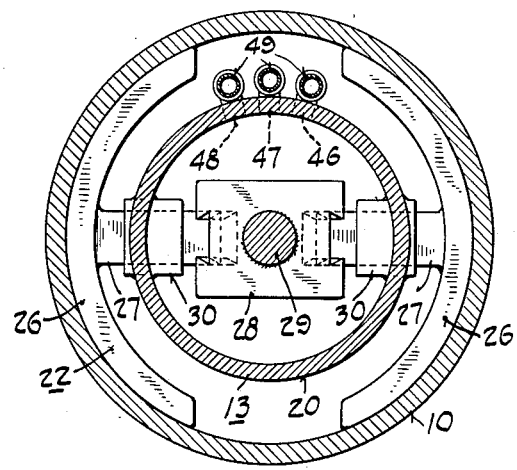
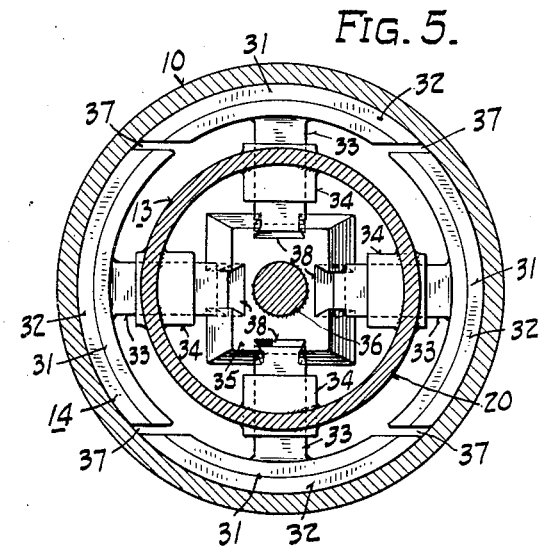
Uriel C. Murcell
INVENTOR.
BY
ATTORNEY.

Patented July 25, 1939

2,167,338

UNITED STATES PATENT OFFICE 2,167,338

WELDING AND SETTING WELL CASING

Uriel C. Murcell, Los Angeles, Calif., assignor to U. C. Murcell, Inc., Los Angeles, Calif., a corporation of California Application July 26, 1937, Serial No. 155,687

12 Claims. (Cl. 166—4)

This invention relates to welding and setting well casing and has particular reference to the welding of plain end casing to provide a string of casing joined by butt welds of substantially the same thickness as the casing.

The principal object of the invention is to provide a method of setting casing by welding, employing a removable welding chill and in which there is no danger of objectionable inside burrs or icicles being formed at the weld.

Another object of the invention is to eliminate the extra space between different size strings of casing as has been necessary with the welded and coupled casing heretofore, and to provide for the setting of different size strings, one within the other, with but small tolerance therebetween.

Another object is to provide a simple and efficient mandrel which may be readily inserted and removed from a vertical joint of casing for facilitating aligning the adjacent ends of casing joints preparatory to welding and for holding a welding chill in place for welding.

These and other objects are more fully set forth in connection with the description of the preferred embodiment as illustrated in the accompanying drawings.

In the drawings:

Fig. 3 is a longitudinal section through the mandrel showing the chill expanded at the casing joint preparatory for the welding of the seam;

Fig. 4 is a transverse section taken on line 4—4 of Fig. 3 showing the construction of the upper aligning shoe of the mandrel; and Fig. 5 is a transverse section taken on line 5—5 of Fig. 3 showing the construction of the welding chill.

In the setting of casing strings heretofore screw threaded couplings have been employed almost exclusively. Welded joints have been employed on surface strings, but here the joints were of the bell and spigot or sleeve type. In both instances the joints employed were considerably thicker than the casing and when setting successive strings of casing of different size in a well a large amount of waste space is necessary between the strings in order to allow for the coupling or sleeve.

In carrying out the present invention this excessive space is unnecessary since the welded joints employed are butt joints and are only slightly thicker than the casing wall. Furthermore the ends of the casing joints are merely beveled and do not require expensive treatment as in the case of threaded and belled joints.

Figure 1:
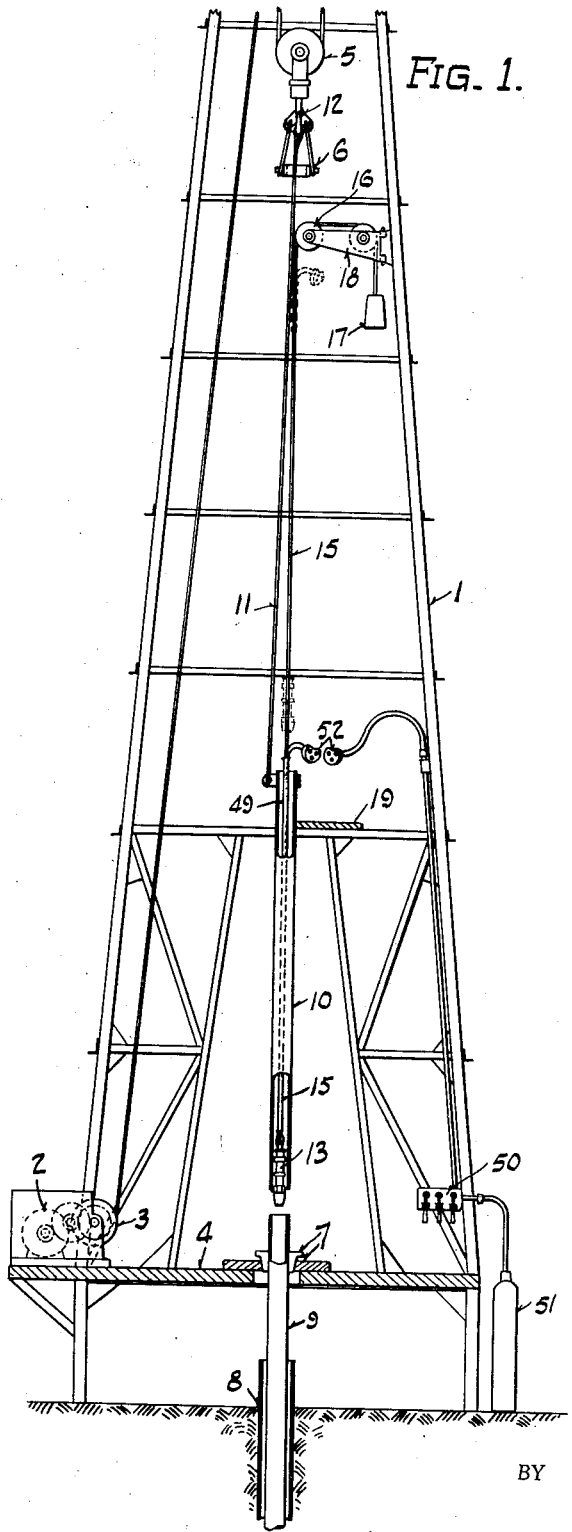
Figure 1 is a diagrammatic side elevational view of the top of an oil well with the derrick and equipment for drilling and showing the apparatus for carrying out the invention.

Referring to Fig. 1 of the drawings the derrick 1 has the usual power unit 2, cable drum 3 and floor 4. It also has the usual block 5 at the top and elevator 6 for lowering the casing in the well. The usual spider and slip 7 is provided in the floor of the derrick directly over the well hole 8 for holding the casing string 9 from falling in the well.

The casing string 9 is held with its upper end a few feet above the derrick floor while a casing joint 10 is lowered onto it by a sling 11 supported from a hook 12 or by a cat line. In carrying out the invention a mandrel 13 is lowered inside the casing section 10 to provide a welding chill 14 for welding the circumferential seam between the lower end of the casing section 10 and the upper end of the casing string 9. After the weld is partially completed the mandrel 13 is removed ready to be inserted in the next casing section.

The mandrel 13 is suspended by a cable 15 passing over a pulley 16 and held by a counterweight 17. The pulley 16 is preferably mounted on a pivoted arm 18. In this way the mandrel 13 may be raised and lowered by a man standing on the stabbing platform 19 part way up the derrick. It is also possible to employ suitable driving means for pulley 16 or cable 15 to raise and lower the mandrel by power or it may be suspended from the cat line.

The mandrel 13 comprises a cylindrical body 20 preferably formed of two parts secured together at the center by bolted flanges, as at 21, an expanding aligning shoe 22, an expanding chill 14, and a protecting head 23.

The body 20 of the mandrel contains two separate pistons 24 and 25. The upper piston 24 operates the expanding aligning shoe 22 and the lower piston 25 operates the expanding chill 14.

Figure 2:
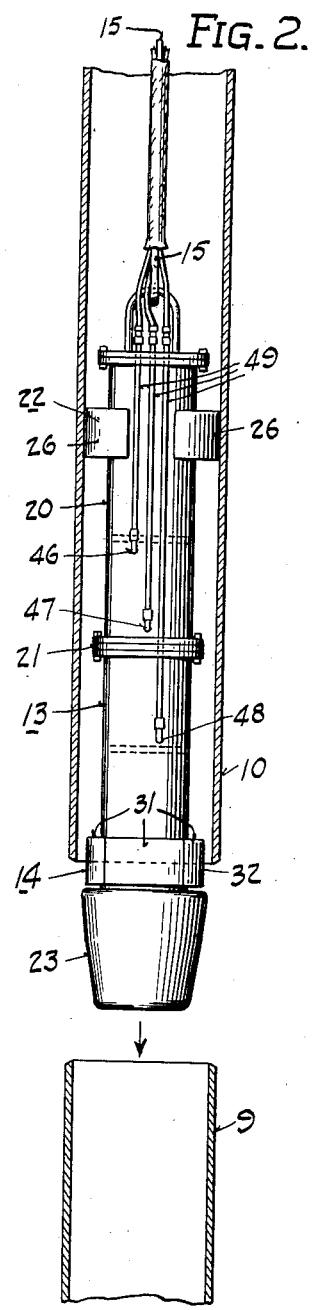
Fig. 2 is an enlarged elevational view of the mandrel shown in Figure 1.

The aligning shoe 22, as shown in Figures 2, 3 and 4, comprises two arcuate locking members 26 for engaging the inner surface of the casing. Each member 26 is mounted on an inwardly extending arm 27 which has a dovetail connection with a cam block 28 mounted on the piston rod 29 of piston 24. The arms 27 are held against vertical movement with block 28 by the bearings 30 so that the arms 27 are allowed only radial movement to force the shoes 22 into pressure contact with the casing and to release the same.

The expanding chill 14, as shown in Figures 2, 3 and 5, comprises four complementary chill members 31 arranged in pairs and each having a copper or other suitable face 32 for chilling the weld deposit. The chill members are mounted on inwardly extending arms 33. The arms 33 are secured for radial movement in bearings 34 and have their inner ends dovetailed to a cam block 35. Movement of the cam block 35 by the piston rod 36 of piston 25 effects radial movement of the arms 33 and the respective chill members.

The chill members 31 may be designed with the slots therebetween extending radially, but it is preferred to extend the slots 37 parallel as shown in Fig. 5 since this permits the withdrawal of the inner pair of members a greater distance thereby allowing greater clearance on two sides for insertion and removal from the casing. As shown by the base lines 38 in Fig. 5 the cams on block 35 for the inner pair of chill members have a greater depth than those for the outer thereby providing for the greater movement of the inner members.

The body 20 defines two cylinders in which the pistons 24 and 25 operate. The cylinders have their adjacent ends open to each other at the center, the dividing plate 39 secured between the flanges at 21 providing a central stop for the piston rods 29 and 36, and the heads 40 and 41 being provided with the usual stuffing boxes 42 for receiving the rods 29 and 36. The removable coverplates 43 in the body casing 20 give access to the stuffing boxes 42 for adjustment.

The piston rods 29 and 36 have their outer ends reciprocate in centering bearings 44 which also serve as dash pots to cushion the movement of the pistons. A coil spring 45 surrounds the rod 29 and supports the piston 24 in upper position when the compressed air is disconnected so as to hold the shoe 22 in retracted position.

The cylinders have three ports for admitting compressed air and for exhaust. Port 46 at the upper end admits compressed air to the upper side of piston 24 for operating the aligning shoe 22. Port 47 is at the center and effects the return movement of both pistons 24 and 25 by admitting compressed air to the chamber between the pistons, to release both the shoe 22 and the chill 14. Port 48 at the lower end admits compressed air to the lower side of piston 25 for operating the chill 14. The ports 46, 47 and 48 also exhaust the air from their respective cylinder chambers.

Three separate compressed air hoses 49 are connected to the respective ports 46, 47 and 48 and connect the same through a suitable control valve 50 to a source of compressed air such as a tank 51. The control valve 50 has a separate lever for each hose to alternately connect it to the supply tank 51 and to the open air for exhaust.

The hoses 49 extend upwardly from mandrel 13 along the cable 15 to a coupling member 52 secured to the derrick at the platform 19 and thence down to the valve 50. When it is desired to raise the mandrel 13 out of the casing the man on platform 19 disconnects the coupling 52 thereby allowing the cable 15 to move upwardly without breaking the hoses. In this way it is unnecessary to have the hoses 49 pass over the pulley 16 and there is no excess hose dangling on the derrick floor during raising and lowering of the mandrel 13. The construction of the coupling 52 is described and claimed in another application Serial No. 183,570 filed Jan. 6, 1938, by the present inventor.

The protecting head 23 for the mandrel 13 is made conical so as to facilitate entrance of the mandrel into the upper end of a casing section and has its upper or base end slightly larger in diameter than the diameter of the retracted chill members 32 so as to protect the latter as the mandrel enters a casing.

In carrying out the process of setting casing, assuming a length of casing to be already in the well, a second length of casing is elevated by means of the sling 11 or cat line to a position over the well and the man on platform 19 drops the mandrel 13 into it and connects the coupling 52. As the head 23 on the mandrel 13 appears at the lower end of the casing and the chill members 31 extend half way out of the casing the man on the derrick floor operates control valve 50 to admit air through port 46 to the upper side of piston 24 thereby operating the aligning shoe 22 to clamp the mandrel in place in the casing.

The casing is then further lowered, the head 23 entering the upper end of the casing in the well and assisting in lining up the two lengths. When the meeting ends of the two casing lengths abut, the operator on the derrick floor operates the control valve 50 to admit compressed air through port 48 to the lower side of piston 25 thereby operating the chill members 31 to press against the abutting edges and align the same for welding.

The welding crew then proceeds to weld the joint. The chill members 31 prevent the welding arc from burning through the seam and from forming burrs and icicles on the inside of the welded joint. After the first pass or deposit of weld metal is made around the circumference of the casing the mandrel 13 may be removed preparatory to insertion in the next length of casing. To do this the operator on the derrick floor moves the control valve 50 to connect the upper side of piston 24 and the lower side of piston 25 to exhaust and to connect port 47 to the supply tank 51 thereby quickly moving the pistons outwardly and releasing the shoe 22 and chill 14 from the casing. The man on platform 19 then disconnects coupling 52 and raises the mandrel 13 from the casing.

The welding of the casing joint proceeds until completed as shown in dotted lines in Fig. 3. The casing is then lowered into the well by means of the elevator 6 and another length is positioned for welding as described above.

The invention may have various modifications within the scope of the claims.

I claim:

1. In the setting of casing in wells the process of aligning sections of casing vertically over the well hole, lowering a mandrel through the upper section until an expansible chill member carried thereby extends partially beyond the lower end of said section, clamping the mandrel in position relative to said upper section, lowering said section into abutting relation to the section of casing in the well and with the chill member extending into the upper end of said last named section, expanding said chill member into circumferential contact with the end portions of said sections, welding said abutting end edges together, releasing said chill member and the mandrel clamp, and removing the mandrel from said casing.

2. In an apparatus for setting well casing by welding, a mandrel suspended from the derrick for limited vertical movement by a counterweight, an expansible aligning shoe carried by the mandrel for securing the latter in position in a vertical section of casing, an expansible chill member carried by the mandrel for facilitating welding of the casing, means for quickly connecting and disconnecting the mandrel to an operating source for operating said aligning shoe and chill member, and a guard at the lower end of said mandrel to protect the chill member during vertical movement of the mandrel into casing sections.

3. In an apparatus for setting well casing by welding, a mandrel suspended from the derrick for limited vertical movement by a counterweight, an expansible aligning shoe carried by the mandrel for securing the latter in position in a vertical section of casing, an expansible chill member carried by the mandrel for facilitating welding of the casing, and means for quickly connecting and disconnecting the mandrel to an operating source for operating said aligning shoe and chill member.

4. In an apparatus for setting well casing by welding, a mandrel suspended from the derrick for limited vertical movement, an expansible chill member carried by the mandrel for facilitating welding of the casing, means for holding said mandrel relative to a section of casing being welded, and means for independently operating said holding means and said chill member.

5. In an apparatus for setting well casing by welding, a mandrel suspended from the derrick for lowering into a section of casing and having an expansible chill member for facilitating welding, and a guard at the lower end of said mandrel for protecting said chill during lowering of the mandrel relative to the casing and for guiding the mandrel into the casing.

6. In an apparatus for setting well casing by welding, a mandrel suspended from the derrick for lowering into a section of casing and having an expansible chill member for facilitating welding, and a guard at the lower end of said mandrel for protecting said chill during lowering of the mandrel relative to the casing and for guiding the mandrel into the casing, said guard having a part of larger diameter than said chill when the latter is in retracted position and of smaller diameter than the inside diameter of the casing.

7. In an apparatus for setting well casing by welding, a mandrel adapted to be lowered in a vertical section of the casing, means carried by the mandrel for engaging the casing to prevent relative movement between the mandrel and casing, a chill carried by the mandrel for facilitating the welding of the casing, and means for operating said first named means and said chill in different time sequence.

8. In an apparatus for setting well casing by welding, a mandrel adapted to be lowered in a vertical section of the casing, means for engaging the casing to prevent relative movement between the mandrel and casing, a chill carried by the mandrel for facilitating the welding of the casing, and means for operating said chill after said first named means engages said casing.

9. A mandrel for insertion in a pair of pipes for aligning the abutting ends thereof in welding a circumferential seam therebetween, comprising a fluid pressure operated clamping device for holding the mandrel in position in one of the pipes, a fluid pressure operated expansible chill member for bridging the abutting ends of the pipe sections and holding the same in alignment for welding, and means for operating said fluid pressure devices independently of each other.

10. A mandrel for insertion in a pair of pipes for aligning the abutting ends thereof in welding a circumferential seam therebetween, comprising a fluid pressure operated clamping device for holding the mandrel in position in one of the pipes, a fluid pressure operated expansible chill member for bridging the abutting ends of the pipe sections and holding the same in alignment for welding, and means for operating said fluid pressure devices indepedently of each other and for reversing the action of said means simultaneously to release both said clamping device and said chill member.

11. In a mandrel for use in the welding of a circumferential seam between two pipe sections, a set of expansible internal clamps for positioning the mandrel in one of the pipe sections, an independently operatable expansible internal chill member for facilitating welding, and means for simultaneously contracting both the clamping and chill means preparatory to removing the mandrel from the pipes.

12. In the setting of casing in wells the process of inserting a mandrel into the upper section until an expansible chill member carried thereby extends partially beyond the lower end of said section, clamping the mandrel in position relative to said upper section, lowering said section into abutting relation to the section of the casing in the well and with the chill member extending into the upper end of said last-named section, expanding said chill member into circumferential contact with the end portions of said sections, welding said abutting end edges together, releasing said chill member and the mandrel clamp and removing the mandrel from said casing.

URIEL C. MURCELL.